Figure 1:
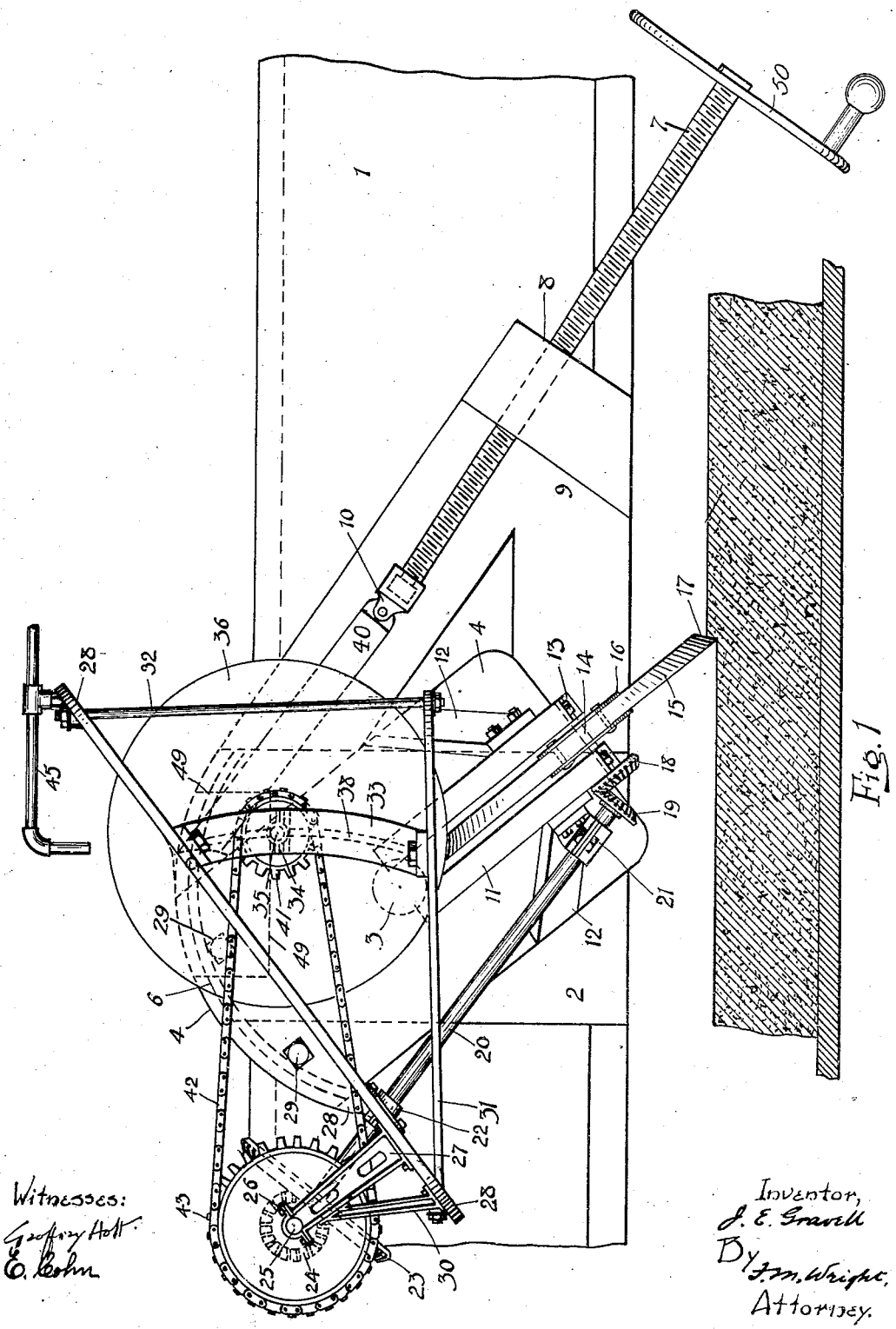

No. 894,267.

PATENTED JULY 28, 1908.

J. E. GRAVELL.
STONE CUTTING MACHINE.
APPLICATION FILED FEB. 11, 1907.

3 SHEETS—SHEET 1.

Witnesses:

Inventor,
J. E. Gravell
By F. M. Wright,
Attorney.

No. 894,267. PATENTED JULY 28, 1908.
J. E. GRAVELL.
STONE CUTTING MACHINE.
APPLICATION FILED FEB. 11, 1907.
3 SHEETS—SHEET 2.
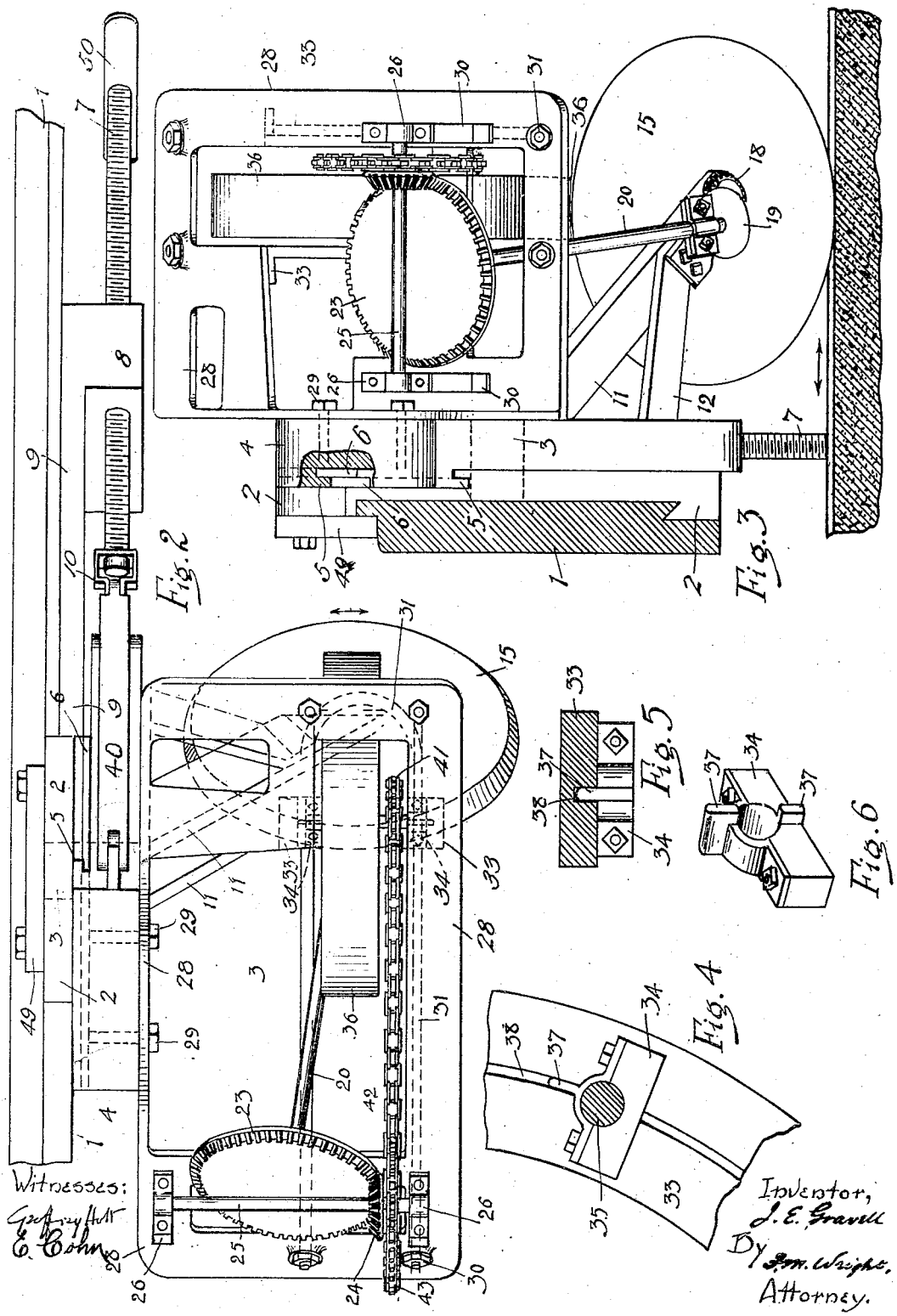

No. 894,267.
PATENTED JULY 28, 1908.
J. E. GRAVELL.
STONE CUTTING MACHINE.
APPLICATION FILED FEB. 11, 1907.
3 SHEETS—SHEET 3.
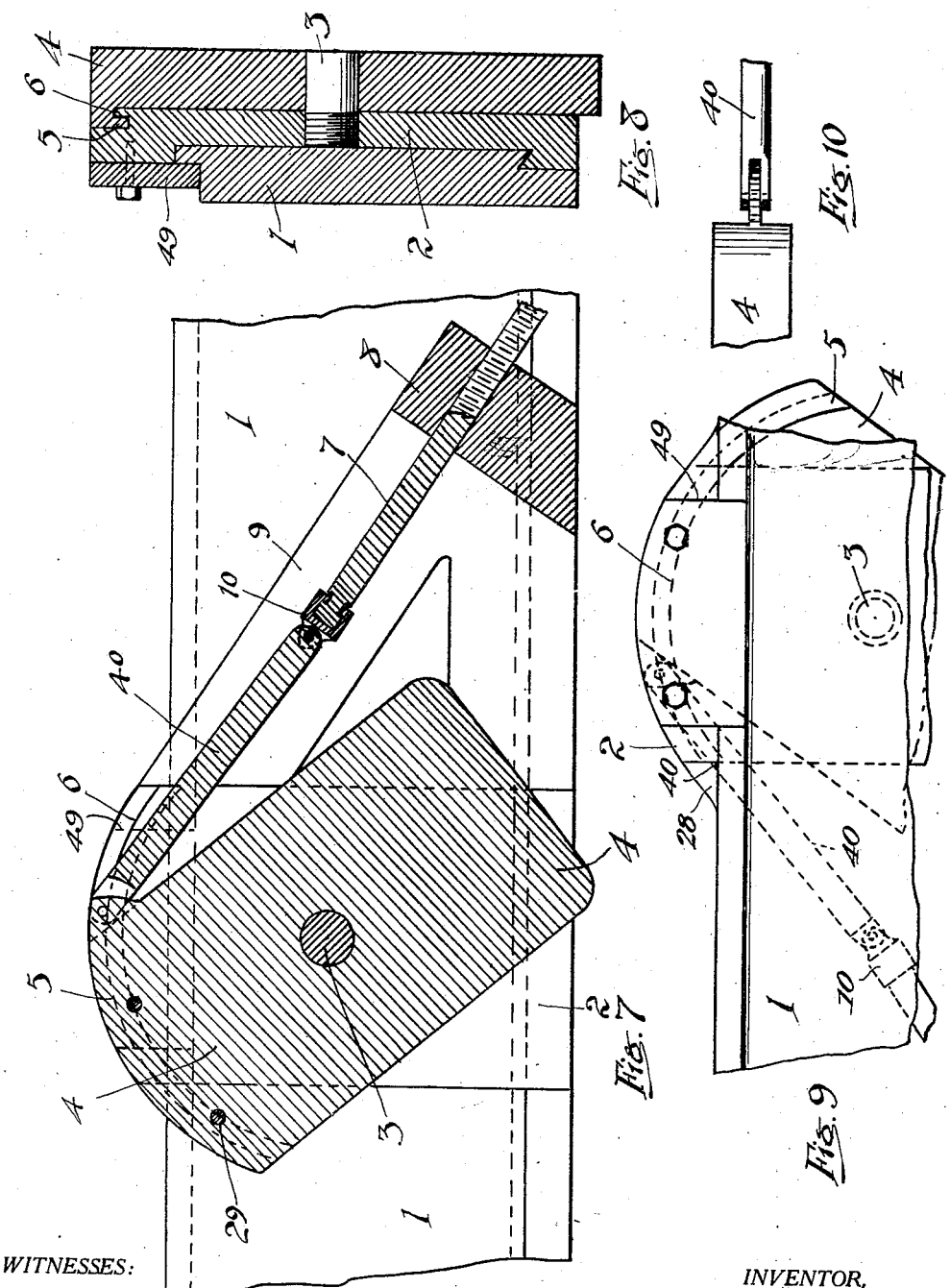
WITNESSES:
INVENTOR,
J. E. Gravell,
BY
ATTORNEY.

UNITED STATES PATENT OFFICE.

JOSEPH E. GRAVELL, OF SAN FRANCISCO, CALIFORNIA.

STONE-CUTTING MACHINE.

No. 894,267.      Specification of Letters Patent.      Patented July 28, 1908.

Application filed February 11, 1907. Serial No. 356,696.

*To all whom it may concern:*

Be it known that I, JOSEPH E. GRAVELL, a citizen of Canada, residing at San Francisco, in the county of San Francisco and State of California, have invented new and useful Improvements in Stone-Cutting Machines, of which the following is a specification.

This invention relates to a machine for cutting granite, the object of the invention being to provide a machine which will be self sharpening, and thus permit of planing granite without any previous dressing by hand, and which will cut straight moldings in granite.

For the sake of illustration I shall show the invention as embodied in a granite planing machine, but certain of the advantages are equally applicable to a lathe for turning granite.

In the accompanying drawings, Figure 1 is a front view of my improvement, part of the machine being broken away; Fig. 2 is a plan view of the same; Fig. 3 is an end view; Fig. 4 is an enlarged broken detail view of a grooved guideway for a grindstone box; Fig. 5 is a section of the same; Fig. 6 is a perspective view of one of the boxes; Fig. 7 is a vertical section taken through the stud shaft, parallel to the cross beam; Fig. 8 is a transverse vertical section through said stud shaft; Fig. 9 is a broken rear view of the planer head and its support; Fig. 10 is a broken top plan view of the connection of the cutter plate holder with the link.

Referring to the drawing, 1 indicates the cross beam of a planing machine of the kind in common use at present for planing soft stone. Upon this beam is supported a planer head 2, being maintained in place by a plate 49 is adapted to be moved longitudinally on the beam in the manner common in such machines. Since the construction for so moving the head is well known, it is not deemed necessary to describe or illustrate the same.

Upon the stud shaft 3 which is at present found in these planer heads is supported a cutter holder plate 4, which can thus have a rotary motion on said shaft, and to guide and support said plate in such movement the upper portion of the plate is formed with a circular overhanging rib or flange 5, which moves in a circular groove 6 formed in the upper side of the planer head. Thus said cutter holder plate can swing on said planer head and assume any angle relative thereto.

In order to adjust the angle at which the cutter holder plate is supported upon the planer head, there is provided a long screw 7, which is screwed through a hole in a lug or boss 8 extending forward from the end of an angular extension 9 from a vertical side of the planer head. The end of said screw rotatably held in a yoke 10 which is jointed to the end of a link 40, the other end of which is similarly connected with the upper corner of the cutter holder plate, so that, by screwing said screw in or out by means of the crank 50, the cutter holder plate may be adjusted to the desired angle upon the planer head, and this can be done without stopping the operation of planing. The screw thus constitutes a power-multiplying means for turning the cutter holder plate upon the planer head.

On the front face of the cutter holder plate are secured two pairs of braces 11, 12, the upper braces 11 extending downward and forward in parallel planes, while the lower braces 12 extend from the sides of the cutter holder forward and inward to meet the lower ends of the upper braces. Bolted on the under sides of the ends of the braces are the boxes 13 of the shaft 14 of the cutter disk 15, and upon the sides of the cutter disk are secured strengthening plates 16, bolted together through said disk. To produce the desired planing action on the surface of the stone shown at 17, the cutter disk is arranged at a suitable angle to the face thereof, the stone being reciprocated through the cutter in the direction of the arrows, Figs. 2 and 3, in the same manner as in the soft stone planing machines now in use. The motion of the stone beneath the planer disk imparts a rotary motion to said disk, and thereby also to a bevel gear 18, secured upon the shaft of said disk, said bevel gear meshing with a bevel gear 19, upon the end of the shaft 20 rotating in lower and upper boxes 21, 22, and carrying at its upper end a bevel gear 23, which meshes with a bevel gear 24 upon a horizontal shaft 25, rotating in bearings 26 upon posts 27 erected upon an open elongated frame 28, the rear side of which is bent up as shown, and secured by bolts 29, to the cutter holder plate, and in addition to the posts 27 the bearings 26 are supported by oblique struts 30, on the end of said frame 28. Secured to the under side of said frame 28 are the ends of a U-shaped brace 31 which extend obliquely downward, the sides of said brace being also connected with ties 32, which extend obliquely upward and are connected to the other end of the open elongated frame 28. The object of this latter construction is to provide supports for guideways 33 for the boxes 34 of the shaft 35 of a grindstone, shown at 36. On the sides of said boxes are formed curved ribs 37, which are adapted to slide in grooves 38 formed in said guideways 33. The lower ends of the guideways are secured to the sides of the U-shaped brace 31 and their upper ends are secured to the under side of the frame 28. The grindstone rests upon the beveled cutting edge of the cutter disk, and descends by gravity as it wears, so that its grinding surface always remains in contact with said cutter edge. It is rotated by means of a small sprocket wheel 41 on its shaft driven by a chain 42 on a sprocket wheel 43, which is attached to the bevel gear 24 which, as already described, is rotated by means of the bevel gear 23. This train of mechanism produces a rotary movement of the grindstone more rapid than that of the cutter disk. The grooved guideways for the shaft of the grindstone are formed in arcs of circles having their centers in the axis of the sprocket wheel 43, which transmits the power, so that, as the grindstone descends from wear, the tension upon the sprocket wheel remains the same. It will thus be seen that the cutter disk is, by the action of the grinding stone, continually sharpened as it is worn by its action upon the granite. 45 indicates a water pipe from which water can drop on to the grindstone; this water, reaching the cutter disk by the way of the grindstone, also keeps said disk cool, and preserves its temper.

The above construction renders it possible to cut straight moldings in granite by machinery, which has always heretofore been done by hand so far as my knowledge extends.

The construction, whereby the edge of the cutter disk is maintained sharp during the operation of the cutting of the stone, thus avoiding the necessity of stopping the operation to sharpen the cutter, may also be applied with suitable changes to other mechanism for cutting granite, and I desire it to be understood that this improvement is within the scope of my invention.

I claim:—

1. In a stone cutting machine, the combination of a rotary cutter disk, a grindstone in contact with the edge of said cutter disk, and a train of mechanism from the shaft of the cutter disk to the shaft of the grindstone, independent of the contact between said cutter disk and grindstone, whereby the grindstone is positively rotated by the rotary movement of the cutter disk, substantially as described.

2. In a stone cutting machine, the combination of a rotary cutter disk, a grindstone in contact with the edge of said cutter disk, and a train of mechanism from the shaft of the cutter disk to the shaft of the grindstone, independent of the contact between said cutter disk and grindstone, whereby the grindstone is positively rotated by the movement of the cutter disk, and more rapidly than said disk, substantially as described.

3. In a stone cutting machine the combination of a rotary cutter disk, a grindstone having a shaft at right angles to that of the cutter disk and having its grinding edge in contact with the edge of said disk, and a train of mechanism, independent of the engagement of said edges, for rotating said grindstone, substantially as described.

4. In a stone cutting machine the combination of a rotary cutter disk, a grindstone having a shaft at right angles to that of the cutter disk and having its grinding edge in contact with the edge of said disk, and a train of mechanism, independent of the engagement of said edges, for rotating said grindstone, more rapidly than the disk, substantially as described.

5. In a stone cutting machine, the combination of a rotary cutter disk, a grindstone having its grinding edge in contact with the edge of the cutter disk, a shaft for the grindstone, rotary mechanism for transmitting power for rotating the grindstone, and guideways permitting the movement of the shaft of the grindstone as it wears in order to maintain contact with the cutter disk, said guideways having grooves in circles having their centers in the axis of the power transmitting mechanism, substantially as described.

6. In a stone cutting machine, the combination of a planer head, a shaft therein, a cutter holder on said shaft, a cutter disk rotatably mounted in said cutter holder, said cutter holder and planer head having co-engaging parts permitting a circular movement about said shaft, a long screw pivotally connected to said cutter holder, and a bearing through which said screw is screwed to turn the cutter holder on its shaft, substantially as described.

7. In a stone cutting machine, the combination of a planer head, a cutter holder rotatably mounted thereon, braces extending outwardly from said holder, boxes in the extended ends of the braces, a shaft rotated in said boxes, a cutter disk on said shaft, a grindstone contacting with the edge of said cutter disk, means for automatically maintaining said grindstone in such contact as it wears, and means for rotating said grindstone, substantially as described.

8. In a stone cutting machine, the combination of a planer head, a cutter holder rotatably mounted thereon, a pair of parallel braces and a pair of converging braces on, and extending outwardly from, said cutter holder, boxes in the extended ends of the braces, a shaft rotated in said boxes, a cutter disk on said shaft, a grindstone contacting with the edge of said cutter disk, means for automatically maintaining said grindstone in such contact as it wears, and means for rotating said grindstone, substantially as described.

9. In a stone cutting machine, the combination of a planer head, a cutter holder rotatably mounted thereon, braces extending outwardly from said holder, boxes in the extended ends of the braces, a shaft rotated in said boxes, a cutter disk on said shaft, strengthening plates at the sides of the cutter disk and secured thereto, a grindstone contacting with the edge of said cutter disk, means for automatically maintaining said grindstone in such contact as it wears, and means for rotating said grindstone, substantially as described.

In testimony whereof I have hereunto set my hand in the presence of two subscribing witnesses.

JOSEPH E. GRAVELL.

Witnesses:
   FRANCIS M. WRIGHT.
   D. B. RICHARDS.